United States Patent [19]

Friedmann

[11] Patent Number: 4,816,006
[45] Date of Patent: Mar. 28, 1989

[54] VIBRATION DAMPING APPARATUS

[75] Inventor: Oswald Friedmann, Lichtenau, Fed. Rep. of Germany

[73] Assignee: Luk Lamellen Und Kupplungsbau GmbH, Bühl, Fed. Rep. of Germany

[21] Appl. No.: 173,064

[22] Filed: Mar. 24, 1988

[30] Foreign Application Priority Data

Apr. 2, 1987 [DE] Fed. Rep. of Germany ....... 3711196

[51] Int. Cl.$^4$ ........................... F16D 3/14; F16D 3/80; F16F 15/12
[52] U.S. Cl. ........................ 464/67; 74/574; 192/106.2; 464/68
[58] Field of Search .................. 74/574; 192/106.2; 464/66, 67, 68

[56] References Cited

U.S. PATENT DOCUMENTS 2,251,128  7/1941  Goodwin ..................... 192/106.2
2,304,039  12/1942  Tower ........................ 192/106.2

FOREIGN PATENT DOCUMENTS 3315484  10/1984  Fed. Rep. of Germany ........ 464/66
2036925   7/1980  United Kingdom ............... 464/66

Primary Examiner—Daniel P. Stodola
Attorney, Agent, or Firm—Peter K. Kontler

[57] ABSTRACT

Apparatus for damping vibrations between the engine and the variable-speed transmission of a motor vehicle has two coaxial flywheels and a damper in a ring-shaped compartment of one of the flywheels. The damper has an annulus of coil springs in the compartment and a flange which is coupled to the other flywheel and has radial arms alternating with the coil springs. The coil springs store energy when the flywheels turn relative to each other because the one flywheel has axially extending recesses in the form of blind bores or holes for loosely inserted disc-shaped stops which engage the end convolutions of the coil springs in the neutral positions of the flywheels.

27 Claims, 4 Drawing Sheets

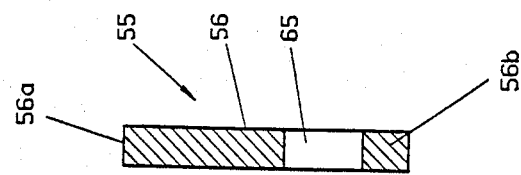
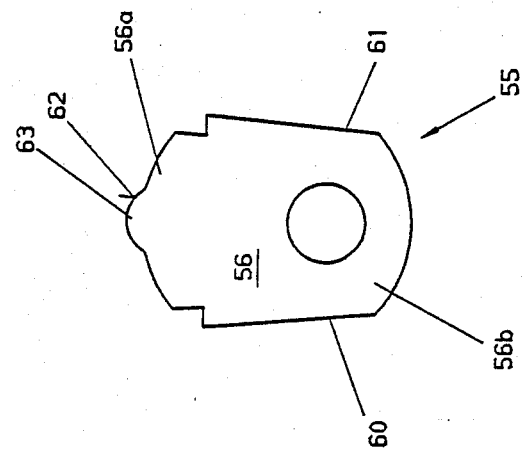

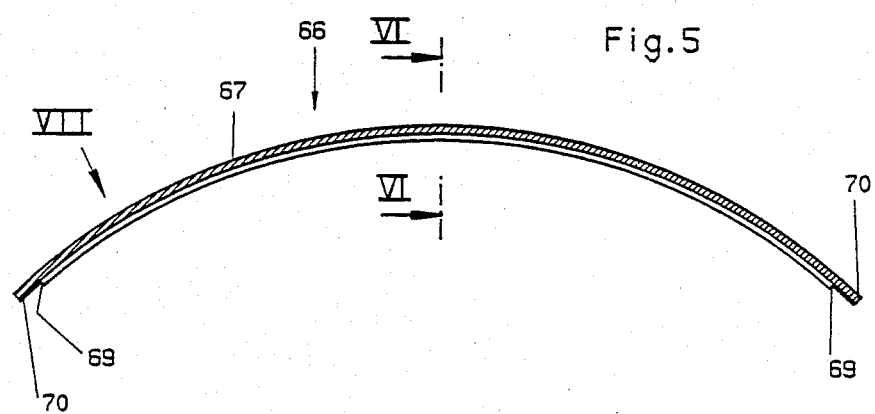
Fig. 5
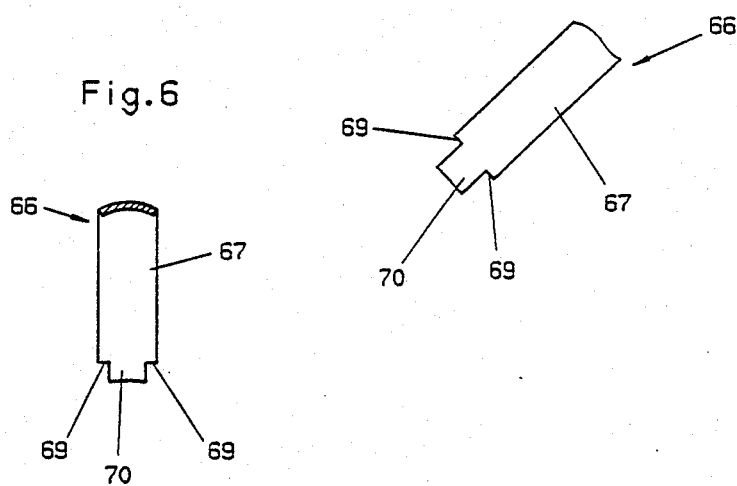
Fig. 6
Fig. 7

VIBRATION DAMPING APPARATUS

BACKGROUND OF THE INVENTION

The invention relates to improvements in vibration damping apparatus, especially to improvements in apparatus which can be used between the engine and the power train of a motor vehicle. More particularly, the invention relates to improvements in vibration damping apparatus of the type wherein one or more dampers are disposed between two coaxial flywheels one of which can be driven by the crankshaft of the internal combustion engine and the other of which can drive the input shaft of a variable-speed transmission in a motor vehicle, preferably in response to engagement of a friction clutch.

It is already known to provide one flywheel of a pair of neighboring flywheels in a vibration damping apparatus with a chamber for one or more dampers which oppose angular movements of the flywheels relative to each other. Each damper can comprise a set of energy storing elements in the form of coil springs, and each set of coil springs can be installed in a discrete compartment of the chamber which is provided in one of the flywheels. For example, the chamber can contain a damper whose coil springs oppose rotation of one flywheel (which is driven by the crankshaft of the engine) relative to the other flywheel (which can rotate the input shaft of the variable-speed transmission). To this end, the other flywheel which can rotate the input shaft carries a flange having windows for portions of the coil springs and extending into the compartment of the chamber in the flywheel which is driven by the engine. The compartment for the coil springs can have a practically circular cross-sectional outline and can be at least partially filled with a viscous fluid, e.g., a fluid of greasy or paste-like consistency. The surfaces which bound the radially outermost portion of the compartment can closely follow the outlines of convolutions of the coil springs, and the radially innermost portion of the compartment can be sealed from the neighboring portions of the chamber save for a relatively narrow gap which permits the viscous fluid to flow from and into the compartment in response to rotation of one of the flywheels relative to the other flywheel. Reference may be had to the commonly owned copending patent application Ser. No. 063,301 filed June 17, 1987 by Oswald Friedmann.

OBJECTS AND SUMMARY OF THE INVENTION

An object of the invention is to provide a vibration damping apparatus which can be assembled in a simple way and in a time-saving operation.

Another object of the invention is to provide a simple and inexpensive apparatus which can be employed as a superior substitute for existing vibration damping apparatus between the engines and the power trains of motor vehicles.

A further object of the invention is to provide an apparatus whose useful life is longer than that of conventional apparatus.

An additional object of the invention is to provide novel and improved damper means for use in the above outlined apparatus, and to provide novel and improved means for guiding, confining and reducing the wear upon the energy storing elements of the damper means.

Still another object of the invention is to provide a novel and improved method of making and installing stops for energy storing elements of damper means in the above outlined apparatus.

A further object of the invention is to provide novel and improved stops for the energy storing elements.

An additional object of the invention is to provide novel and improved means for reducing wear upon the energy storing elements.

The invention is embodied in an apparatus for damping vibrations, especially between an engine and a power train (e.g., in a motor vehicle). The improved apparatus comprises a first flywheel which is connectable with the engine, and a second flywheel which is rotatable relative to and coaxial with the first flywheel and is connectable with the power train, particularly by way of a clutch (such as the friction clutch in a motor vehicle). One of the flywheels has a substantially ring-shaped compartment, and the apparatus further comprises damper means which is operative to oppose rotation of the flywheels relative to each other and includes at least one damper having an annulus of energy storing elements (such as coil springs) which are snugly received in the compartment, a flange which is provided with openings for the energy storing elements and extends radially into the compartment, and substantially disc-shaped stops which extend in part into the compartment between the energy storing elements and in part into axial recesses of the one flywheel in the radial region of the compartment. The latter has arcuate portions between the stops (as seen in the circumferential direction of the flywheels), and the damping apparatus further comprises means for transmitting torque between the flange and the other flywheel. The compartment can be provided in the first flywheel, and the stops preferably extend beyond the compartment in the radial direction of the flywheels. The compartment can have a substantially circular cross-sectional outline, the same as the energy storing elements.

The one flywheel can be composed of, or can include, two sections which are provided with substantially ring-shaped grooves. The grooves constitute or form part of the compartment. The thickness of the stops in the axial direction of the flywheels is preferably less than the depth of the grooves, and each of the recesses for the stops can have a substantially circular outline. Such recesses can constitute axially parallel blind bores or holes.

The apparatus preferably further comprises means for preventing rotation of the stops in the respective recesses, and each such rotation preventing means can comprise a projection which is provided on the respective stop and extends into a complementary notch of the one flywheel. The notches can constitute portions of the respective recesses. The projections can extend radially of the flywheels and outwardly from the remaining (major) portions of the respective stops.

At least one of the stops can be provided with an aperture extending substantially axially of the flywheels. The aperture can be provided in the inner portion of the one stop (as seen in the radial direction of the flywheels). The radially innermost and outermost portions of the stops can have a partly circular outline and extend into complementary portions of the respective recesses. The stops are preferably provided with substantially radially extending and substantially flat edge faces which abut the neighboring energy storing elements. The stops can constitute stampings.

The flange is provided with arms which alternate with the energy storing elements and extend radially of the flywheels. The flywheels are movable relative to each other to and from neutral angular positions, and each arm of the flange is disposed between a pair of stops (as seen in the axial direction of the flywheels) when the flywheels assume their neutral angular positions.

A wear-resistant insert can be provided in the compartment adjacent the energy storing elements. Such insert is preferably formed with a concave side which faces the energy storing elements, and the insert is preferably disposed in the outermost portion of the compartment (as seen in the radial direction of the flywheels). The arrangement is preferably such that the insert abuts at least one of the stops so that it cannot move in the compartment in the circumferential direction of the flywheels. In accordance with a presently preferred embodiment, the insert is assembled of several arcuate portions or sections, for example, one for each energy storing element. The arcuate sections can be provided with shoulders which abut the adjacent stops. The stops are preferably disposed in pairs, and the stops of each pair are spaced apart from each other in the axial direction of the flywheels. Each section of the insert can have a pair of aligned shoulders at each of its ends, and each pair of shoulders abuts the adjacent pair of stops. Each section of the insert can be provided with a pair of relatively narrow end portions in the form of tongues each of which projects beyond a pair of shoulders in the circumferential direction of the flywheels and into the space between the adjacent pair of stops. The tongues can serve to maintain the adjacent pairs of stops in their respective recesses.

The novel features which are considered as characteristic of the invention are set forth in particular in the appended claims. The improved vibration damping apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 is a central sectional view of a stop;

FIG. 4 is an elevational view of the stop;

FIG. 5 is a central longitudinal sectional view of a section of the insert;

FIG. 6 is a sectional view as seen in the direction of arrows from the line VI—VI of FIG. 5; and FIG. 7 is a fragmentary plan view as seen in the direction of arrow VII in FIG. 5.

DESCRIPTION OF THE PREFERRED EMBODIMENTS

Figure 1:
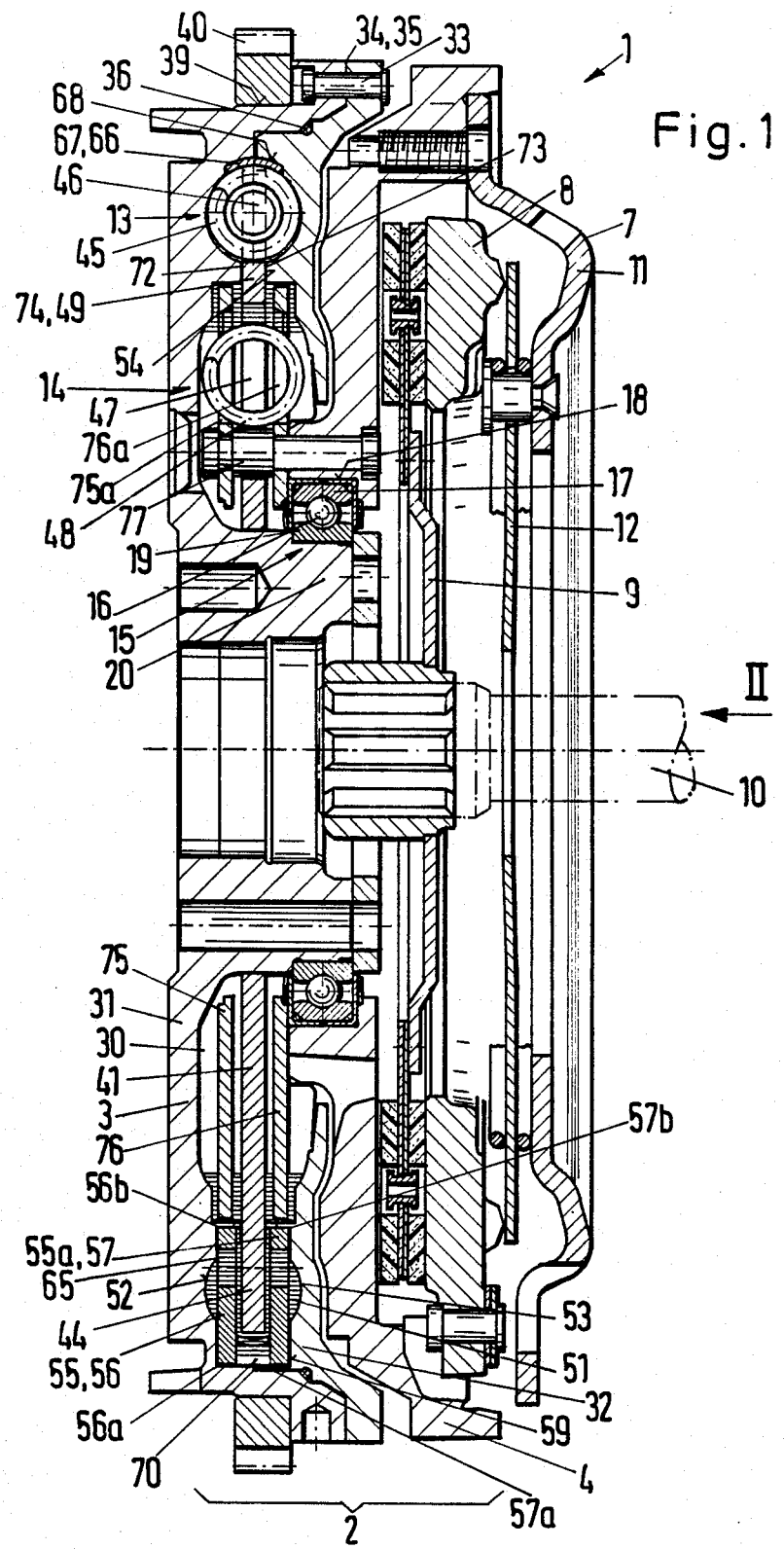
FIG. 1 is a central sectional view of a vibration damping apparatus which embodies one form of the invention.
Figure 2:
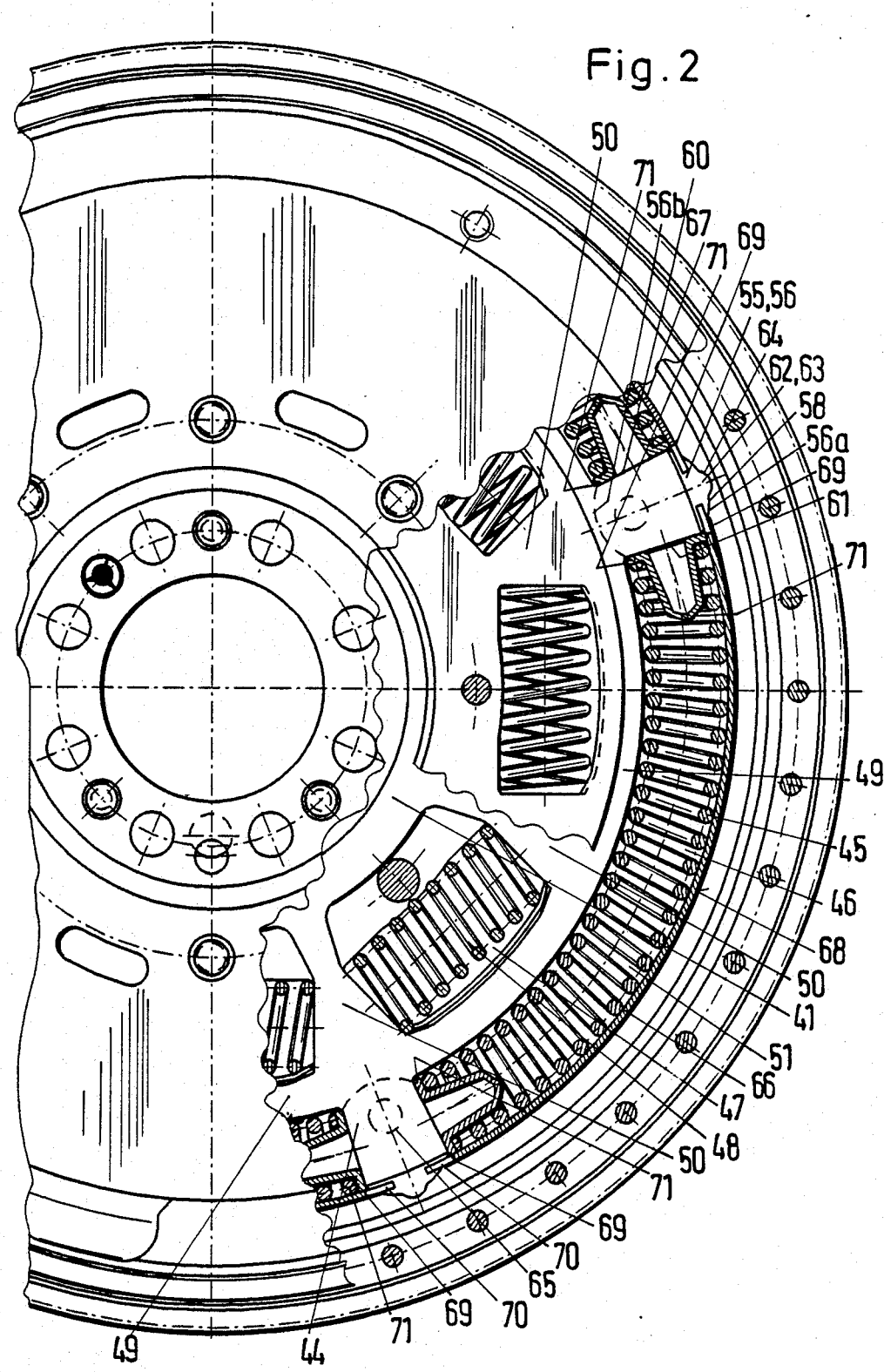
FIG. 2 is a fragmentary elevational view as seen in the direction of arrow II in FIG. 1; with certain parts broken away.

The damping apparatus 1 which is shown in FIGS. 1 and 2 serves to transmit torque as well as to compensate for shocks which develop during transmission of torque. The apparatus comprises a composite flywheel 2 which is composed of a plurality of coaxial components (hereinafter called flywheels). The illustrated composite flywheel 2 has a first flywheel 3 which can be attached to the crankshaft of the engine in a motor vehicle by a set of bolts or by other suitable fasteners, and a second flywheel 4 which can turn relative to the flywheel 3 (and vice versa) and can transmit torque from the flywheel 3 to the input shaft 10 of a variable-speed transmission by way of a friction clutch 7. The cover or housing 11 of the clutch 7 is affixed to and rotates with the flywheel 4, and the clutch 7 further comprises a pressure plate 8 which is axially movably installed between the flywheel 4 and cover 11 and shares all angular movements of the flywheel 4. A clutch plate or disc 9 of the clutch 7 has an internally splined hub which is non-rotatably mounted on the input shaft 10, and a pair of friction linings between the pressure plate 8 and the flywheel 4. A diaphragm spring 12 is mounted between two ring-shaped seats at the inner side of the cover 11 and serves to normally urge the pressure plate 8 against the adjacent friction lining so that the other friction lining bears against the flywheel 4 and rotates therewith when the engine drives the flywheel 3. The radially inwardly extending prongs (not specifically shown) of the diaphragm spring 12 can be shifted in the axial direction of the input shaft 10 to relax the pressure of the spring 12 upon the pressure plate 8 in order to disengage the clutch 7 and to allow the flywheel 4 to rotate relative to the input shaft 10.

The apparatus 1 further comprises a first or outer damper 13 and a second or inner damper 14. The dampers 13 and 14 are connected in series and serve to oppose angular movements of the flywheels 3 and 4 relative to each other.

The flywheel 3 has an axial protuberance 20 which extends in a direction away from the aforementioned crankshaft and into a centrally located recess 18 of the flywheel 4. Antifriction bearing means 15 including a ball bearing 16 is installed between the flywheels 3, 4 so as to reduce friction when one of the flywheels rotates relative to the other flywheel. The inner race 19 of the ball bearing 16 is mounted on the protuberance 20, and the recess 18 receives the outer race 17. Means (not referenced) are provided for holding the inner race 19 against axial movement relative to the flywheel 3 and for holding the outer race 17 against axial movement relative to the flywheel 4. The illustrated ball bearing 16 comprises a single row of spherical rolling elements between the inner and outer races 19, 17.

The flywheel 3 includes or constitutes a housing or casing which is provided with an annular chamber 30 for the dampers 13, 14. The housing includes a first section 31 at one side of the chamber 30 and a second section 32 at the opposite side of the chamber 30. Those portions of the sections 31, 32 which extend radially outwardly beyond the chamber 30 are connected to each other by rivets 33 or by other suitable fastener means which maintain a radially extending surface 34 of the section 31 in contact with a radially extending surface 35 of the section 32. A sealing ring 36 is recessed into one of the surfaces 34, 35 and bears against the other surface to thus prevent communication between the chamber 30 and the surrounding atmosphere in the region around the outer damper 13. The sealing ring 36 is located radially inwardly of the rivets 33. The section 31 (which is nearer to the engine than the section 32) has a peripheral surface 39 which is engaged by a starter gear 40 that rotates with the flywheel 3. The gear 40 can be shrunk onto the peripheral surface 39. At least one of the sections 31, 32 can be made of cast iron.

The outer damper 13 has a flange-like output element 41 (hereinafter called flange for short) which is provided with radially outwardly extending projections or arms 44 which alternate with and serve as stops for energy storing elements 45 in the form of coil springs. These coil springs are received in arcuate openings in the form of recesses 46 which are flanked by the arms 44 and are disposed radially outwardly of circumferentially extending windows 47 in the flange 41. The windows 47 accommodate energy storing elements in the form of coil springs 48. The coil springs 45 are component parts of the outer damper 13, and the coil springs 48 constitute component parts of the inner damper 14. The openings or recesses 46 are separated from the neighboring windows 47 by arcuate webs 49 of the flange 41, and the neighboring windows 47 are separated from each other by radially extending ribs 50 of the flange 41.

The radially outer portion of the chamber 30 constitutes or resembles a ring-shaped compartment 51 which receives the coil springs 45 of the outer damper 13. A first portion of this compartment is formed by a substantially ring-shaped groove 52 in the adjacent side of the housing section 31, and a second portion of the compartment 51 is formed by a ring-shaped groove 53 in the adjacent side of the housing section 32. The grooves 52, 53 receive those portions of the coil springs 45 which extend axially of the composite flywheel 2 beyond the respective sides of the flange 41. The compartment 51 is substantially sealed from the radially innermost portion of the chamber 30 by the webs 49 of the flange 41 save for a relatively narrow clearance or gap between the webs 49 and the housing section 31 and/or a relatively narrow clearance or gap between the webs 49 and the housing section 32. FIG. 1 shows, by way of example, a relatively narrow clearance or gap 54 between the webs 49 and the housing section 32.

FIGS. 1 and 2 show that the surfaces (on the sections 31, 32 and webs 49) bounding the compartment 51 of the chamber 30 are configurated in such a way that they closely follow the external surfaces of the coil springs 45. This ensures that the convolutions of the coil springs 45 can lie against the radially outermost portions of the surfaces bounding the grooves 52, 53 when the convolutions tend to move radially outwardly under the action of centrifugal force. Such surfaces not only serve as abutments but also as guide means for the coil springs 45, not necessarily only when the flywheel 3 rotates and the coil springs 45 are acted upon by centrifugal force but also when the flywheel 3 is at a standstill in a neutral position or rotates at a low speed (i.e., when the centrifugal force is small). Such configuration of the surfaces surrounding the compartment 51 results in less pronounced wear upon the convolutions of the coil springs 45 and/or upon the housing sections 31, 32 and/or upon the flange 41 because the area of contact between the coil springs and the housing sections as well as between the coil springs and the flange is relatively large.

The end convolutions of the coil springs 45 are acted upon by stops 55, 55a which are introduced into the compartment 51 at opposite sides of the arms 44 of the flange 41. Each arm 44 is flanked by a pair of stops 55, 55a (as seen in the axial direction of the composite flywheel 2) in the neutral angular positions of the flywheels 3, 4 relative to each other. In the illustrated embodiment, the length of the stops 55, 55a in the circumferential direction of the flywheels 3, 4 is the same as that of the arms 44. Each stop 55 includes a disc 56, and each stop 55a includes a disc 57. The discs 56 of the stops 55 are loosely received in complementary recesses 58 of the housing section 31, and the discs 57 of the stops 55a are loosely received in the complementary recesses 59 of the housing section 32. The stops 55, 55a extend radially inwardly and outwardly beyond the compartment 51 and its grooves 52, 53, and the recesses 58, 59 extend axially of the flywheels 3, 4 beyond the respective stops 56, 57. In other words, the thickness of the stops 56, 57 is less than the depth of the respective recesses 58, 59.

As can be seen in FIG. 2, each of the recesses 58, 59 has a partly circular outline. The outline is not exactly circular because the depth of the grooves 52, 53 exceeds the thickness of the respective recesses 58, 59. The recesses 58, 59 can be formed by removing material from the respective sections 31, 32 (particularly by counterboring) or by countersinking. Each disc 56 has a partly circular radially outermost portion 56a and a partly circular radially innermost portion 56b. Analogously, each disc 57 has a partly circular radially outermost portion 57a and a partly circular radially innermost portion 57b. These radially innermost and outermost portions of the discs 56, 57 are snugly received in the respective portions of the corresponding recesses 58, 59. The discs 56 have flat edge faces 60 which abut the end convolutions of the adjacent coil springs 45, and the discs 57 have similar flat edge faces 61 which also abut the adjacent end convolutions of the coil springs 45. The edge faces 60, 61 extend substantially radially of the flywheels 3 and 4.

FIG. 2 further shows rotation preventing means 62 which are installed in the recesses 58, 59 to prevent any turning of the respective discs 56, 57 therein. The rotation preventing means 62 are projections 63 which are provided on the radially outermost portions 56a, 57a of the respective discs 56, 57 and extend into complementary notches 64 which are portions of the respective pairs of recesses 58, 59, namely the radially outermost portions of these recesses. Each of the notches 64 is bounded by an arcuate surface which is part of a cylindrical surface. This simplifies the making of the notches 64 because they can constitute portions of bores which are machined into the housing sections 31 and 32. These bores can be formed in the housing sections 31, 32 prior to removal of material for the purpose of forming the major portions of the recesses 58 and 59.

The radially inner portions of the discs 56, 57 are formed with notches or with bores (shown at 65).

In order to reduce wear upon the radially outermost portions of surfaces surrounding the grooves 52, 53 in the housing sections 31 and 32, the apparatus further comprises an insert 66 which is preferably made of a highly wear-resistant material and is received in a shallow radially outermost portion 68 of the chamber 30 radially outwardly of the grooves 52, 53. The insert 66 surrounds the entire annulus of coil springs 45 and is preferably assembled of several arcuate sections or portions 67 each of which resembles a shallow trough which is bent in two directions, namely circumferentially of the flywheels 3, 4 as well as circumferentially of the convolutions of the coil springs 45 so that the concave inner sides of the arcuate sections 67 closely follow the outlines of the adjacent portions of the coil springs 45. Each arcuate section 67 of the insert 66 extends between two neighboring pairs of discs 56, 57. The radially outermost portion 68 of the chamber 30 for the arcuate sections 67 of the insert 66 can include a plurality of arcuate depressions, one for each of the arcuate sections 67. Such arcuate depressions which together constitute the arcuate portion 68 can be formed by removing material from the housing sections 31, 32 or during casting of these housing sections. The curvature of one of the arcuate sections 67 in the circumferential direction of the convolutions of the adjacent coil spring 45 can be seen in the upper part of FIG. 1, and the curvature of the arcuate sections 67 in the circumferential direction of the flywheels 3, 4 can be seen in FIG. 2.

In order to prevent undesirable sliding in the circumferential direction of the flywheels 3, 4 or other stray movements of arcuate sections 67 of the insert 66 in the radially outermost portion 68 of the compartment 51, at least the ends of the arcuate sections 67 have a width greater than the distance between the respective discs 56, 57. This results in the formation of pairs of shoulders 69 which are provided on the arcuate sections 67 and abut the adjacent pairs of discs 56, 57 so that the sections 67 are held against movement in the circumferential direction of the flywheels 3 and 4.

FIG. 2 further shows that the ends of the arcuate sections 67 are provided with tongue-like extensions 70 which project beyond the respective pairs of shoulders 69 and into the spaces between the adjacent discs 56, 57, and each such extension has a width which equals or approximates the width of the space between the neighboring discs 56, 57 (as measured in the axial direction of the flywheels 3 and 4). Thus, the extensions 70 can be said to constitute distancing elements which ensure that the adjacent discs 56, 57 are loosely held in their respective recesses 58, 59 against appreciable axial movement toward each other.

FIG. 2 further shows cupped retainers 71 for the end convolutions of the coil springs 45. Each retainer 71 is adjacent the respective edge face 60 or 61 of the adjacent arm 44 and extends into the adjacent end convolution or convolutions of the neighboring coil spring 45. The collars at the open ends of the cupped retainers 71 fit rather snugly into the adjacent portions of the compartment 51.

Those portions of the housing sections 31, 32 which extend radially inwardly of the compartment 51 have neighboring surfaces 72, 73 which define a space 74 for the webs 49 of the flange 41. The surfaces 72, 73 are substantially annular and receive the webs 49 with the aforementioned clearance(s) or gap(s) 54. Thus, the gap or gaps 54 can be said to constitute a portion or two portions of the space 74.

The flange 41 constitutes the output element of the outer damper 13 and the input element of the inner damper 14. The radially inner portion of the flange 41 is disposed between two annular walls 75, 76 which are secured to each other by distancing elements 77 in the form of rivets anchored in the flywheel 4. The flange 41 has cutouts in the form of elongated slots for the shanks of the distancing elements 77. The walls 75, 76 are respectively provided with windows 75a, 76a registering with the windows 47 of the flange 41 and receiving portions of the coil springs 48. These coil springs oppose rotation of the flywheel 4 and walls 75, 76 relative to the flange 41 and vice versa.

The chamber 30 contains a supply of viscous fluid, preferably a lubricant (such as silicone oil or grease). The quantity of viscous fluid is preferably selected in such a way that, when the flywheels 3 and 4 rotate and the fluid is acted upon by centrifugal force, the fluid fills the compartment 51 at least to the axes of convolutions of the coil springs 45. In the embodiment of FIGS. 1 and 2, the fluid (indicated by horizontal lines) fills the chamber 30 to a level such that the radially outermost portions of the coil springs 48 are contacted by the radially innermost portion of the annulus of viscous material which is formed when the flywheels 3, 4 rotate so that the fluid is urged into the radially outer portion of the chamber 30. Thus, the fluid can lubricate the convolutions of the coil springs 48 in those regions where such convolutions are likely to contact the radially outermost portions of surfaces in the windows 47 of the flange 41. This results in a pronounced reduction of wear upon the flange 41 and coil springs 48 and in longer useful life of the entire apparatus.

An important advantage of the improved apparatus is that that the stops 55, 55a can be mass-produced at a low cost and can be readily assembled with the sections 31, 32 of the flywheel 3 by being loosely received in the respective recesses 58, 59. This obviates the need for riveting, welding or otherwise permanently securing the stops 55, 55a to the flywheel 3. The area of contact between the stops 55, 55a and the sections 31, 32 is larger and the stops are mounted in a more reliable way if the stops extend radially inwardly and/or outwardly beyond the corresponding portions of the compartment 51. This enhances the reliability of engagement between the radial edge faces 60, 61 and the cups 71 for the coil springs 45. The cups 71 constitute desirable but optional features of the damper 13, i.e., the edge faces 60, 61 can bear directly against the adjacent end convolutions of the springs 45.

The compartment 51 has a circular or substantially circular cross-sectional outline to snugly receive the coil springs 45. The thickness of the stops 55, 55a is preferably less than the depth of the respective grooves 52, 53 at the corresponding sides of the flange 41. This can be readily seen in the lower portion of FIG. 1. However, it is equally within the purview of the invention to increase the thickness of the stops 55, 55a so that the outer side of each stop extends all the way to or even beyond the deepmost portion of the compartment 51. For example, the stop 55 in the lower portion of FIG. 1 can extend to the left beyond the deepmost portion of the groove 52, and the stop 55a in the lower portion of FIG. 1 can extend to the right beyond the deepmost portion of the groove 53. In such modified apparatus, the pairs of axially aligned recesses 58, 59 for relatively thick stops 55, 55a actually divide or break up the compartment 51 into an annulus of arcuate portions, one for each coil spring 45. Each such arcuate portion of the compartment 51 is at least substantially sealed (with the possible exception of a narrow clearance or gap), at least in the neutral or starting angular positions of the flywheels 3, 4 relative to each other.

The provision of recesses 58, 59 in the form of substantially circular blind bores or holes in the sections 31, 32 of the flywheel 3 contributes to lower cost of the flywheel 3. Such blind bores or holes can be formed by a suitable face milling or drilling tool. The utilization of a drilling or boring tool is desirable when the flywheel 3 is assembled of or includes two substantially washer- or disc-like sections 31, 32 (as actually shown in the drawing). As mentioned above, at least one of the sections 31, 32 can constitute a casting. If the sections 31, 32 are made of metallic sheet material, the recesses 58, 59 can be made in a stamping or upsetting machine.

The recesses 58, 59 preferably constitute blind bores or holes if the chamber 30 contains a supply of viscous fluid because this eliminates the possibility of uncontrolled leakage of fluid by way of the recesses. Thus, the number of sealing elements can be reduced to a minimum in contrast to conventional apparatus wherein the stops are riveted to the respective flywheels. Riveting is a costly and time-consuming operation. In addition, the rivets must be tested to ascertain the presence of leaks.

The rotation preventing means 62 ensure that each of the stops 55, 55a is maintained in an optimum position with reference to the coil springs 45. Moreover, such rotation preventing means reduce the cost of assembling the apparatus because the orientation of the stops need not be checked prior to riveting (at 33) of the sections 31, 32 to each other. The notches 64 for the projections 63 of the rotation preventing means 62 can be formed with a milling or boring tool in sections 31, 32 which constitute castings, or in a stamping or upsetting machine if the sections 31, 32 are made of metallic sheet stock. The stability of stops 55, 55a (when the flywheel 3 rotates) is enhanced if the projections 63 are integral parts of the outer portions 56a, 57a of the respective stops 55, 55a. This shifts the center of gravity of each stop 55, 55a radially outwardly to thus enhance the stability of the stops when the flywheel 3 rotates.

The apertures 65 in the stops 55, 55a facilitate the mounting of stops in the respective recesses 58, 59. As mentioned above, each of these apertures can constitute a circular hole or bore in the radially inner portion of the respective stop. This, combined with the provision of projections 63 on the radially outermost portions of the stops, ensures that the center of gravity of each stop is as remote from the common axis of the flywheels 3, 4 as possible.

The feature that the stops 55, 55a include substantially circular innermost and outermost portions (in the radial direction of the flywheels 3, 4) contributes to lower cost of making the stops. Such circular radially innermost and outermost portions of the stops are received in complementary portions of the respective recesses 58, 59.

The stops 55, 55a can constitute mass-produced stampings. In order to reduce wear, at least those portions of the stops which engage the coil springs 45 or the cups 71 can be made of hardened material or can be coated with layers of wear-resistant metallic, ceramic or other material. Surface hardening and/or coating of selected portions of the stops constitutes one presently preferred mode of reducing wear upon the stops. It is also possible to harden each and every portion of each stop. At least some of the stops can be made of compacted particulate wear-resistant material by press forming or by sintering.

If the width of the stops 55, 55a matches the width of the arms 44 (in the circumferential direction of the flywheels 3, 4), the coil springs 45 can be caused to store energy in several steps (i.e., each of these coil springs can have a multi-stage characteristic) in that the axial length of at least one coil spring (as measured in the circumferential direction of the flywheels 3 and 4) in unstressed condition of such one coil spring is at least slightly less than the distance between the corresponding arms 44. However, the same effect can be achieved by using a flange 41 wherein at least one of the arms 44 is wider or narrower than the other arms (in the circumferential direction of the flywheels 3 and 4), or by using a flange 41 wherein one of the arms 44 is not disposed exactly midway between the neighboring stops 55, 55a but is offset relative thereto in the circumferential direction of the flywheels when the dampers 13, 14 assume their neutral positions.

The sections 67 of the insert 66 can be made of hardened metallic material, such as suitably shaped sheet steel, and can be placed adjacent those portions of coil springs 45 which would otherwise bear against the sections 31, 32 of the flywheel 3 under the action of centrifugal force. The sections 67 are loosely inserted into the radially outermost portion 68 of the compartment 51 to be held against movement in the circumferential direction of the flywheel 3 by the neighboring pairs of stops 55 and 55a. It is equally possible to employ a one-piece ring shaped insert 66 which is non-rotatably installed in the portion 68 of the compartment 51. For example, the one-piece insert can be provided with one or more cutouts for one or more stops 55 and/or 55a so that it is reliably held against movement relative to the flywheel 3. The width of the one-piece insert or of the sections 67 in the axial direction of the flywheels 3, 4 exceeds the distance between a pair of aligned stops 55, 55a except in the region of the tongues 70 (this results in the formation of the shoulders 69). The tongues 70 prevent the stops 55, 55a from leaving (slipping or falling out of) their respective recesses 58, 59.

While it is possible to employ a one-piece insert 66 or several arcuate sections 67 which are in mere linear contact with the coil springs 45, it is preferred to provide the one-piece insert or each section 67 with an inner side which is concave in two directions so as to be in large-area contact with the coil springs, at least when the coil springs are acted upon by centrifugal force. This reduces the likelihood of extensive wear upon the coil springs and on the one-piece or composite insert.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for damping vibrations, especially between an engine and a power train, comprising a first flywheel connectable with the engine; a second flywheel rotatable relative to said first flywheel and connectable with the power train, particularly by way of a clutch, one of said flywheels having a ring-shaped compartment; damper means operative to oppose rotation of said flywheels relative to each other and including at least one damper having an annulus of energy storing elements snugly received in said compartment, a flange provided with openings for said elements and extending radially into said compartment, and substantially disc-shaped stops extending in part into said compartment between said elements and in part into axial recesses of said one flywheel in a radial region of said compartment, said compartment having arcuate portions between said stops; and means for transmitting torque between said flange and the other of said flywheels.

2. The apparatus of claim 1, wherein said energy storing elements are springs, said compartment being provided in said first flywheel.

3. The apparatus of claim 1, wherein said stops extend beyond said compartment in the radial direction of said flywheels.

4. The apparatus of claim 1, wherein said compartment has a substantially circular cross-sectional outline.

5. The apparatus of claim 4, wherein said one flywheel has two sections provided with substantially ring-shaped grooves which together form said compartment, the thickness of said stops in the axial direction of said flywheels being less than the depth of said grooves.

6. The apparatus of claim 1, wherein each of said recesses has a substantially circular outline.

7. The apparatus of claim 6, wherein said recesses are axially parallel blind bores.

8. The apparatus of claim 1, further comprising means for preventing rotation of said stops in the respective recesses.

9. The apparatus of claim 8, wherein each of said rotation preventing means comprises a projection provided on the respective stop and extending into a notch of said one flywheel.

10. The apparatus of claim 9, wherein said notches constitute portions of the respective recesses.

11. The apparatus of claim 9, wherein said projections extend radially of said flywheels and outwardly from major portions of the respective stops.

12. The apparatus of claim 1, wherein at least one of said stops has an aperture extending in the axial direction of said flywheels.

13. The apparatus of claim 12, wherein said one stop has an inner portion and an outer portion as seen in the radial direction of said flywheels, said aperture being provided in the inner portion of said one stop.

14. The apparatus of claim 1, wherein each of said stops has an innermost and an outermost portion as seen in the radial direction of said flywheels, each of said innermost and outermost portions having a partly circular outline and said recesses having complementary portions for the innermost and outermost portions of the respective stops.

15. The apparatus of claim 1, wherein said stops have substantially flat edge faces abutting the neighboring elements and extending substantially radially of said flywheels.

16. The apparatus of claim 1, wherein said stops are stampings.

17. The apparatus of claim 1, wherein said flange has arms extending into said compartment substantially radially of said flywheels and alternating with said energy storing elements.

18. The apparatus of claim 17, wherein said flywheels are movable from neutral angular positions relative to each other and each of said arms is disposed between a pair of said stops in the neutral angular positions of said flywheels.

19. The apparatus of claim 1, further comprising a wear-resistant insert provided in said compartment adjacent said energy storing elements.

20. The apparatus of claim 19, wherein said insert has a concave side facing said energy storing elements.

21. The apparatus of claim 19, wherein said compartment has an outermost portion in the radial direction of said flywheels, said insert being disposed in said outermost portion.

22. The apparatus of claim 19, wherein said insert abuts at least one of said stops so that said one stop prevents the insert from moving in the circumferential direction of said one flywheel.

23. The apparatus of claim 22, wherein said insert includes a plurality of arcuate sections.

24. The apparatus of claim 23, wherein said arcuate sections have shoulders abutting the neighboring stops.

25. The apparatus of claim 24, wherein said stops include pairs of stops and said arcuate sections have portions adjacent the respective pairs of stops and provided with said shoulders which abut the respective pairs of stops.

26. The apparatus of claim 24, wherein said stops include pairs of stops and each of said arcuate sections has a tongue-like end portion disposed between a pair of said stops and extending beyond a shoulder of the respective arcuate section in the circumferential direction of said flywheels, said shoulders being disposed in pairs and abutting the adjacent pairs of said stops next to the respective tongue-like end portions.

27. The apparatus of claim 26, wherein said end portions are dimensioned to maintain the neighboring pairs of stops in their respective recesses.

* * * * *